(12) United States Patent
Bozio et al.

(10) Patent No.: US 9,657,772 B2
(45) Date of Patent: May 23, 2017

(54) MECHANISM FOR VEHICLE INTERIOR COMPONENT

(71) Applicant: Johnson Controls Technology Company, Holland, MI (US)

(72) Inventors: Ronald A. Bozio, Holland, MI (US); Craig D. Flowerday, Holland, MI (US)

( * ) Notice: Subject to any disclaimer, the term of this patent is extended or adjusted under 35 U.S.C. 154(b) by 0 days.

(21) Appl. No.: 14/423,511

(22) PCT Filed: Aug. 29, 2013

(86) PCT No.: PCT/US2013/057292
§ 371 (c)(1),
(2) Date: Feb. 24, 2015

(87) PCT Pub. No.: WO2014/036260
PCT Pub. Date: Mar. 6, 2014

(65) Prior Publication Data
US 2015/0184692 A1    Jul. 2, 2015

Related U.S. Application Data

(60) Provisional application No. 61/695,828, filed on Aug. 31, 2012.

(51) Int. Cl.
| | | |
|---|---|---|
| *B60R 7/00* | (2006.01) | |
| *F16C 29/00* | (2006.01) | |
| *B60N 2/46* | (2006.01) | |
| *B60N 2/48* | (2006.01) | |
| *B60N 3/10* | (2006.01) | |
| *B60R 7/04* | (2006.01) | |

(Continued)

(52) U.S. Cl.
CPC .......... *F16C 29/005* (2013.01); *B60N 2/4646* (2013.01); *B60N 2/4808* (2013.01); *B60N 3/10* (2013.01); *B60R 7/04* (2013.01); *F16C 29/02* (2013.01); *F16C 33/20* (2013.01)

(58) Field of Classification Search
CPC ........ F16C 29/005; F16C 29/02; F16C 33/20; B60N 2/4646; B60N 2/4808; B60N 3/10; B60N 7/04
USPC .......... 296/37.8; 297/411.37, 411.21, 411.35
See application file for complete search history.

(56) References Cited

U.S. PATENT DOCUMENTS

| | | | |
|---|---|---|---|
| 6,135,529 A | 10/2000 | De Angelis et al. | |
| 7,077,468 B2 * | 7/2006 | Maierholzner | B60N 2/4646 220/348 |

(Continued)

FOREIGN PATENT DOCUMENTS

| | | |
|---|---|---|
| CN | 1747855 A | 3/2006 |
| CN | 2936834 Y | 8/2007 |

(Continued)

OTHER PUBLICATIONS

PCT International Search Report and Written Opinion mailed Dec. 11, 2013.

*Primary Examiner* — Joseph D Pape

(57) ABSTRACT

A system for a motor vehicle with a first assembly having a first substrate and a rail extending outwardly from the first substrate. The system also includes a second assembly having a second substrate and a clamp extending outwardly from the second substrate. The clamp is slidably coupled to the rail and configured to apply a lateral force to the rail to dampen longitudinal motion of the second assembly relative to the first assembly.

16 Claims, 3 Drawing Sheets

(51) Int. Cl.
 *F16C 29/02* (2006.01)
 *F16C 33/20* (2006.01)

(56) References Cited

U.S. PATENT DOCUMENTS

| | | |
|---|---|---|
| 7,641,284 B2 * | 1/2010 | Jones .................. A47C 1/03 |
| | | 297/115 |
| 8,132,861 B2 | 3/2012 | Cone |
| 8,333,432 B2 | 12/2012 | Cone |
| 2004/0108740 A1 | 6/2004 | Maierholzner |
| 2008/0067828 A1 | 3/2008 | Sturt |
| 2010/0289317 A1 | 11/2010 | Cone |
| 2012/0049601 A1 | 3/2012 | van Rothkirch und Panthen et al. |
| 2012/0212026 A1 | 8/2012 | Cone |

FOREIGN PATENT DOCUMENTS

| | | |
|---|---|---|
| CN | 101992713 A | 3/2011 |
| DE | 10236582 | 2/2004 |
| JP | 2009-292366 A | 12/2009 |
| JP | 2010-023641 A | 2/2010 |
| JP | 2010-264162 A | 11/2010 |

\* cited by examiner

US 9,657,772 B2

MECHANISM FOR VEHICLE INTERIOR COMPONENT

CROSS REFERENCE TO RELATED APPLICATION

This application is a national stage of PCT Application No. PCT/US2013/57292, entitled "FRICTIONAL SLIDING MECHANISM FOR INTERIOR ASSEMBLY OF A VEHICLE", filed on Aug. 29, 2013, which claims priority from and the benefit of U.S. Provisional Patent Application Ser. No. 61/695,828, entitled "FRICTIONAL SLIDING MECHANISM FOR INTERIOR ASSEMBLY OF A VEHICLE", filed Aug. 31, 2012. Each of the foregoing applications is hereby incorporated by reference in its entirety.

BACKGROUND

The invention relates generally to motor vehicles, and more particularly, to a frictional sliding mechanism for interior assembly of a motor vehicle.

Various systems within a motor vehicle include sliding mechanisms. For example, an armrest, a storage compartment, a cup holder, a headrest, and a sun visor may each include a sliding mechanism to facilitate adjustment. Each sliding mechanism may incorporate a variety of different moving parts. For example, a sliding mechanism may include viscous dampers, springs, and/or grease. Unfortunately, such sliding mechanisms may apply a variable amount of sliding resistance over their life cycle, and may have a finite number of available stops. For example, sliding mechanisms that include viscous devices may operate in a variable manner based on the temperature of the sliding mechanism. Therefore, an occupant may find the sliding mechanisms do not function with a consistent fluid movement. Moreover, certain viscous dampers, such as rack and pinion viscous dampers may produce unwanted noise.

BRIEF DESCRIPTION OF THE INVENTION

The present invention relates to a system for a motor vehicle. The system includes a first assembly having a first substrate and a rail extending outwardly from the first substrate. The system also includes a second assembly having a second substrate and a clamp extending outwardly from the second substrate. The clamp is slidably coupled to the rail and configured to apply a lateral force to the rail to dampen longitudinal motion of the second assembly relative to the first assembly.

The present invention also relates to a system for a motor vehicle having a first substrate with a rail extending outwardly therefrom. The system also includes a second substrate and a clamp fixedly coupled to the second substrate. The clamp extends outwardly from the second substrate. The clamp is slidably coupled to the rail and configured to apply a lateral force to the rail to dampen longitudinal motion of the second substrate relative to the first substrate.

The present invention further relates to an armrest assembly for a motor vehicle. The armrest assembly includes a first substrate having a rail extending outwardly therefrom and a second substrate. The armrest assembly also includes a clamp with a first arm having a first shoe and a second arm having a second shoe. The clamp is fixedly coupled to and extends outwardly from the second substrate. Moreover, the clamp is slidably coupled to the rail and configured to dampen longitudinal motion of the second substrate relative to the first substrate. The first arm is configured to apply a first force against a first lateral side of the rail. Further, the first shoe is configured to engage the first lateral side of the rail. The second arm is configured to apply a second force against a second lateral side of the rail, and the second shoe is configured to engage the second lateral side of the rail.

The present invention relates to a console for a vehicle interior. The console may comprise a base comprising a rail and an assembly comprising a clip configured to couple the assembly to the base and to slide relative to the base. The clip may be configured to apply a clamping force to the rail; the clip may be configured to slide along the rail. The clip may comprise a set of arms configured to apply a force to the rail; the clip may comprise a set of shoes configured to slide along the rail. A frictional force may be produced between the set of shoes and the rail when the assembly slides relative to the base. The frictional force may be a braking force. The at least one shoe comprises at least one of acrylonitrile butadiene styrene (ABS), polycarbonate (PC), PC/ABS, polypropylene (PP) and/or polytetrafluoroethylene (PTFE). The rail may be formed from a polymer based material; the rail and the base may be formed in one part. The rail may comprise at least one of a track and/or a guide. The clip may comprise a clamp. The clip may be configured to resist relative motion of the assembly and the base by providing a clamping force on the rail. The clip may be configured to grip the rail; the clip may be configured to apply a clamping force to the rail. The clip may comprise a set of shoes configured to slide along the rail. The shoe may comprise at least one of acrylonitrile butadiene styrene (ABS), polycarbonate (PC), PC/ABS, polypropylene (PP) and/or polytetrafluoroethylene (PTFE). The present invention may further relate to a vehicle interior component. The component may comprise a base comprising a clamp and an armrest configured to couple to the base and to slide relative to the base. The clamp may be configured to provide a clamping force to resist relative motion of the armrest and the base.

DRAWINGS

DETAILED DESCRIPTION

Figure 1:
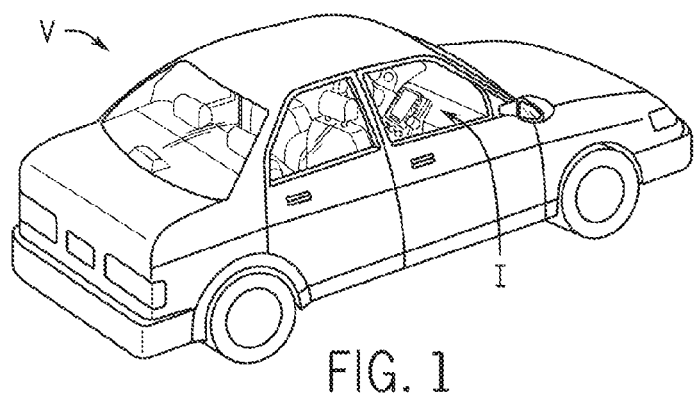
FIG. 1 is a perspective view of an exemplary vehicle that may include frictional sliding mechanism according to an exemplary embodiment.

FIG. 1 is a perspective view of an exemplary vehicle V that may include a frictional sliding mechanism. The vehicle V, in this case a car, includes an interior I. The vehicle V may include one or more systems that include frictional sliding mechanisms. The vehicle V may include an armrest, a storage compartment, a cup holder, a headrest, and/or a sun visor that includes a frictional sliding mechanism to facilitate adjustment of the respective interior component. The frictional sliding mechanism may include one or more clamps coupled to a rail. The one or more clamps may apply a lateral force to the rail to hold the respective component in a desired position. When the lateral force is overcome, the one or more clamps may slide along the length of the rail, facilitating movement of the component. The frictional sliding mechanism facilitates movement of the one or more clamps along the length of the rail without using a viscous material; the sliding resistance of the frictional sliding mechanism may remain consistent with a change in temperature. The frictional sliding mechanism may be moved throughout its life cycle by overcoming a substantially non-variable amount of sliding resistance. The frictional sliding mechanism may not include any stops, but may function as if it has an unlimited number of stops, and the frictional sliding mechanism may move quietly.

Figure 2:
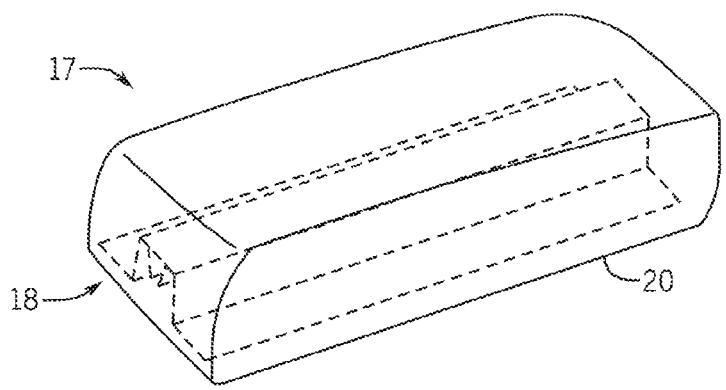
FIG. 2 is a perspective view of an embodiment of an armrest support having a frictional sliding mechanism disposed on a bottom portion of the armrest support according to an exemplary embodiment.

FIG. 2 is a perspective view of an embodiment of the armrest 17 for an armrest support 18 having a frictional sliding mechanism 20 disposed on a bottom portion of the armrest support 18. The armrest 17 may be attached to the armrest support 18. The armrest support 18 includes the frictional sliding mechanism 20 to facilitate armrest adjustment. The armrest support 18 includes a movable substrate 22 that moves in a longitudinal direction relative to a fixed substrate 30 coupled to the bottom of the movable substrate 22. See FIGS. 3A and 3B. The movable substrate 22 may include ribs that provide structural support to an attached armrest. The movable substrate 22 may include openings to facilitate attaching an armrest to the movable substrate 22.

Figure 3A:
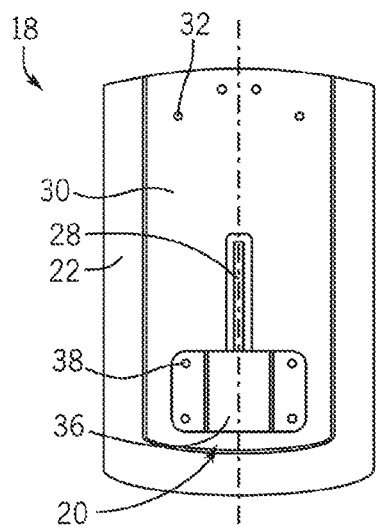
FIG. 3A is a bottom view of the armrest support of FIG. 2 having the movable substrate in a non-extended position relative to a fixed substrate according to an exemplary embodiment.

FIG. 3A is a bottom view of the armrest support 18 of FIG. 2 having the movable substrate 22 in a non-extended position relative to a fixed substrate 30. The frictional sliding mechanism 20 includes a rail 28 extending outwardly from the movable substrate 22, and a clamp configured to slide along lateral sides of the rail 28. The rail 28 may be integrally formed with the movable substrate 22 (e.g., via a single mold), forming a movable assembly, or the rail 28 may be formed separately from the movable substrate 22, and coupled to the movable substrate 22 to form the movable assembly. The rail 28 may slide within the clamp when sufficient force is applied to the rail 28 via the movable substrate 22. The movable substrate 22 may move quietly from one position to another.

Figure 3B:
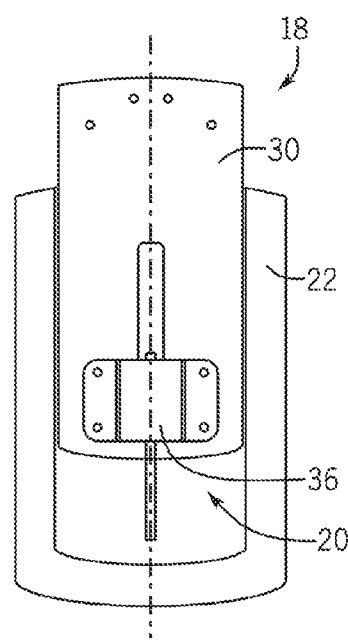
FIG. 3B is a bottom view of the armrest support of FIG. 2 having the movable substrate in an extended position relative to a fixed substrate according to an exemplary embodiment.

According to an exemplary embodiment, a fixed substrate 30 is coupled under the movable substrate 22. When the movable substrate 22 moves the fixed substrate 30 remains stationary; the movable substrate 22 moves in a longitudinal direction relative to the fixed substrate 30. The fixed substrate 30 includes openings 32 for attaching the fixed substrate 30 to the motor vehicle V. The fixed substrate 30 may be attached to the motor vehicle V through a hinge, or another device. The substrate 30 in the present embodiment is fixed; and the substrate 22 is movable to move the substrate 22 relative to the substrate 30. In other embodiments, the substrate 22 may be fixed; the substrate 30 may be movably attached to the substrate 22 to move the substrate 30 relative to the substrate 22. The frictional sliding mechanism 20 includes a clamp assembly 34 having a clamp configured to slide along the lateral sides of the rail 28 as the rail 28 moves within the clamp. The clamp assembly 34 includes a substrate 36 that attaches to the clamp, and to the fixed substrate 30 via openings 38. The substrate 36 and the fixed substrate 30 may be integrally formed. FIG. 3B is a bottom view of the armrest support 18 of FIG. 2 having the movable substrate 22 in an extended position relative to the fixed substrate 30.

Figure 5:
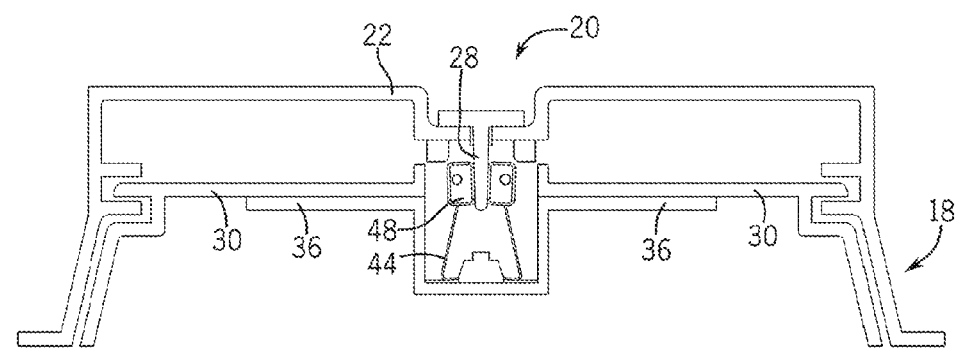
FIG. 5 is a cross-sectional view of the armrest support of FIG. 2 according to an exemplary embodiment.

FIG. 5 is a cross-sectional view of the armrest support 18 of FIG. 2. A clamp 40 is rigidly (e.g., fixedly) coupled to the substrate 36 and extends outwardly from the substrate 36. The clamp 40 is coupled to the rail 28. The clamp 40 may frictionally engage the rail 28 such that friction may be overcome to move the movable substrate 22 relative to the fixed substrate 30. The clamp 40 includes arms 44. The arms 44 are biased toward the rail 28 to apply a lateral force to the rail 28 to dampen longitudinal motion of the movable substrate 22 relative to the fixed substrate 36. The clamp 40 may include spring like features to apply a force from the first arm 44 toward a first lateral side of the rail 28, and to apply a force from the second arm 44 toward a second lateral side of the rail 28.

According to an exemplary embodiment, the first arm 44 includes a shoe 48 configured to engage the first lateral side of the rail 28, and the second arm 44 includes a shoe 48 configured to engage the second lateral side of the rail 28. The rail 28, the arms 44 and/or the shoes 48 may be manufactured from one or more materials that facilitate movement of the rail 28 within the clamp 40. The rail 28, the arms 44, and/or the shoes 48 may be manufactured from a material including a polymer based material. The rail 28, the first and second arms 44, and/or the shoes 48 may be manufactured from acrylonitrile butadiene styrene (ABS), polycarbonate (PC), PC/ABS, polypropylene (PP), polytetrafluoroethylene (PTFE), or any other suitable material.

According to an exemplary embodiment, an armrest support 18 of an armrest assembly and other systems of the motor vehicle V may include the clamp assembly 34 of the frictionally sliding mechanism 20, and/or the assembly including the movable substrate 22; a storage compartment, a cup holder, a headrest and/or a sun visor may include such assemblies.

Figures 6A, 6B:
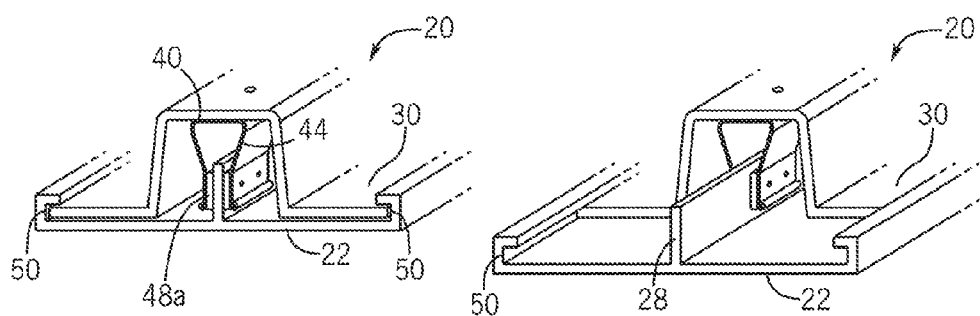
FIGS. 6A and 6B are schematic perspective views of a mechanism for the armrest support according to an exemplary embodiment.
Figure 7:
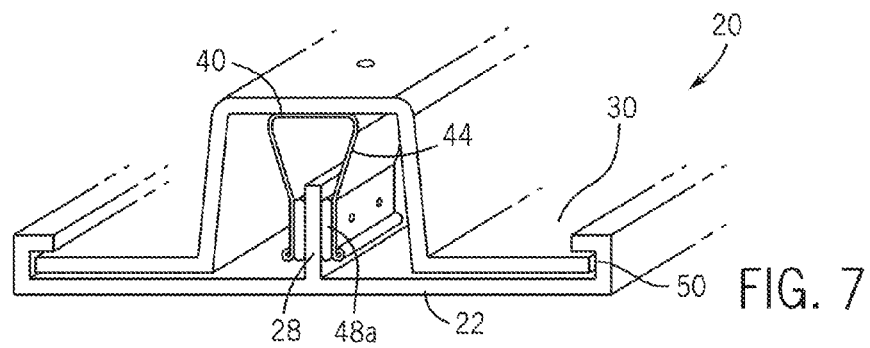
FIG. 7 is a schematic perspective view of a friction sliding mechanism in a retracted position according to an exemplary embodiment.

FIGS. 6A, 6B and 7 are perspective views of an embodiment of the frictional sliding mechanism 20. The substrate 22 includes the rail 28 extending outwardly. The clamp 40 is coupled to the substrate 36 of the clamp assembly 34. The clamp 40 includes the first arm 44 having the first shoe 48a, and the second arm 44 having the second shoe 48a. The substrate 22 includes slots 50 to block the substrate 36 from moving vertically or laterally away from the substrate 22. The substrate 36 may move longitudinally back and forth and the clamp 40 may slide along the rail 28. The substrate 22 may be either attached to the motor vehicle V, or the substrate 22 may be configured to move relative to the motor vehicle V and/or the substrate 30. The substrate 30 may be either attached to the motor vehicle V, or the substrate 30 may be configured to move relative to the motor vehicle V and/or the substrate 22.

According to an exemplary embodiment the rail 28 extends in a substantially straight line of the substrate 22; the rail 28 may extend in a curved manner along the substrate 22. The rail 28 may be part of a dashboard storage compartment. The rail 28 may be curved to move within the clamp 40. The clamp 40 may frictionally engage the rail 28 such that friction may be overcome to open and/or close the dashboard storage compartment.

Figure 8:
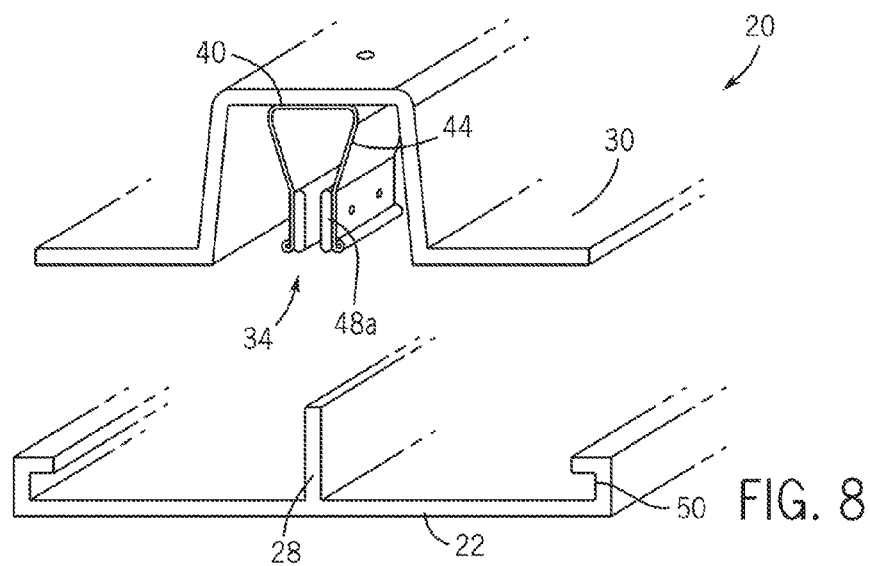
FIG. 8 is an exploded view of the frictional sliding mechanism of FIG. 6.

FIG. 8 is an exploded view of the frictional sliding mechanism 20. According to an exemplary embodiment, the substrate 36 may slide within the slots 50 of the substrate 22. Moreover, the shoes 48a may be positioned on opposite lateral sides of the rail 28, and may engage the lateral sides of the rail 28. The rail 28 may be a continuous material without any openings. A profile of the rail 28 may change along a length of the rail 28 (e.g. a change in thickness, shape, continuity and/or size of the rail 28) to direct the clamp 40 to act with different forces at different areas of the rail 28. The rail 28 may have certain portions that are thicker than other portions of the rail 28, the rail 28 may have notches to act as detents and the rail 28 may have openings. The clamp 40 may be manufactured to exert a sufficient force such that movement of the clamp 40 along the rail 28 is difficult. The clamp 40 may include a latch to release and/or reduce the clamping force provided by the clamp 40. The clamp assembly 34 may include multiple clamps 40, such that the clamps 40 are difficult to move along the rail 28. The first clamp 40 may include a latch to release the first clamp 40 from exerting clamping force on the rail 28 and facilitate movement of a second clamp 40 along the rail 28. The clamping force of the clamps 40 of the clamp assembly 34 may be adjusted to any suitable clamping force.

According to an exemplary embodiment, the frictional sliding mechanism may be formed at least partially from polymer based materials (e.g., plastic). The frictional sliding mechanism may be formed completely from polymer based materials. The frictional sliding mechanism may operate consistently under a variety of temperature and/or other atmospheric conditions. The components of the frictional sliding mechanism may provide consistent actuation over an extended duration.

Figure 4:
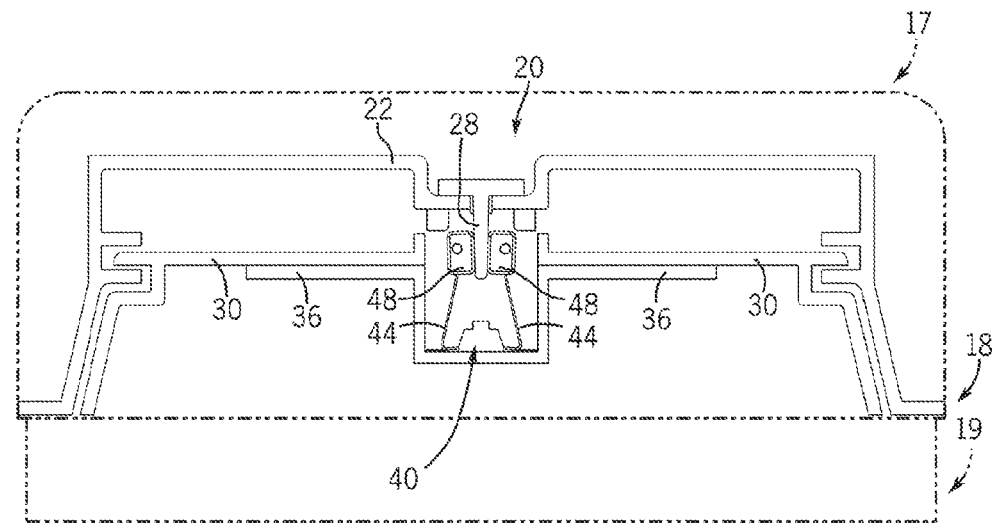
FIG. 4 is a cross-section view of the armrest support according to an exemplary embodiment.

As shown schematically in FIG. 4, the armrest support 18 may be concealed within an armrest 17. Armrest 17 may provide aesthetic/decorative characteristics and serve as the passenger/occupant interface for the armrest support 18. As shown schematically in FIG. 4, a storage compartment 19 may be provided underneath the armrest 17. The storage compartment may provide a storage volume for items (e.g. sunglasses, electronic devices, wallets, etc.).

As shown schematically in FIG. 6A, the movable substrate 22 is in the non-extended position relative to the fixed substrate 30. As shown schematically in FIG. 6B, the movable substrate 22 is in the extended position relative to the fixed substrate 30.

Figure 9:
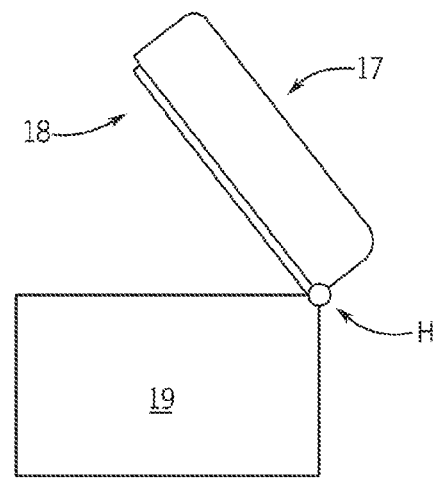
FIG. 9 is a schematic side view of the armrest and the storage compartment connected by a hinge according to an exemplary embodiment.

As shown schematically in FIG. 9, the console (e.g. system) provides an armrest 17 on armrest support 18; armrest support 18 is supported by console (e.g. base) with storage compartment 19; armrest support 18 is coupled to console with hinge H. The system comprises a storage compartment having a first assembly (e.g. base, console, etc.) or a second assembly (e.g. armrest assembly, etc.)

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or resequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A console for a vehicle interior comprising:
    (a) a base comprising a rail providing a wall with a set of sides;
    (b) an assembly comprising a clip configured to couple the assembly to the base and to slide relative to the base;
    wherein the clip is configured to apply a clamping force to the rail;
    wherein the clip comprises a set of arms configured to couple the assembly to the base by applying the clamping force to the wall;
    wherein the clamping force comprises a set of normal forces normal to the wall.

2. The console of claim 1 wherein the clip is configured to slide along the rail.

3. The console of claim 1 wherein the set of arms is configured to apply the set of normal forces to the set of sides of the wall.

4. The console of claim 1 wherein the clip comprises a set of shoes configured to slide along the rail.

5. The console of claim 2 wherein a friction force is produced between the set of arms of the clip and the wall of the rail when the assembly slides relative to the base.

6. The console of claim 5 wherein the set of walls comprise a set of opposed walls and the friction force is a braking force.

7. The console of claim 4 wherein the set of shoes comprises at least one of (a) acrylonitrile butadiene styrene (ABS), (b) polycarbonate (PC), (c) PC/ABS, (d) polypropylene (PP), (e) polytetrafluoroethylene (PTFE).

8. The console of claim 1 wherein the rail is formed from a polymer based material.

9. The console of claim 1 wherein the rail and the base are formed in one part.

10. The console of claim 1 wherein the rail comprises at least one of (a) a track and (b) a guide.

11. The console of claim 1 wherein the clip comprises a clamp.

12. A console for a vehicle interior comprising:
    (a) a base comprising a rail providing a wall with a set of opposed sides;
    (b) an assembly comprising a clip configured to couple the assembly to the base and to slide relative to the base;
    wherein the clip is configured to resist relative motion of the assembly and the base by providing a clamping force on the set of opposed sides of the rail;

wherein the clamping force by the clip on the rail comprises a set of opposed normal forces by the clip on the set of opposed sides of the wall.

13. The console of claim 12 wherein the clip is configured to grip the wall.

14. The console of claim 12 wherein the clip comprises a set of arms configured to clamp the rail by application of the set of opposed normal forces on the set of opposed sides of the wall.

15. The console of claim 12 wherein the clip comprises a set of shoes configured to slide along the set of opposed side walls of the rail.

16. The console of claim 15 wherein the set of shoes comprises at least one of (a) acrylonitrile butadiene styrene (ABS), (b) polycarbonate (PC), (c) PC/ABS, (d) polypropylene (PP), (e) polytetrafluoroethylene (PTFE).

* * * * *